United States Patent
Takahashi

(10) Patent No.: US 10,256,749 B2
(45) Date of Patent: Apr. 9, 2019

(54) PIEZOELECTRIC ACTUATOR, MOTOR, ROBOT, AND METHOD OF DRIVING PIEZOELECTRIC ACTUATOR

(71) Applicant: Seiko Epson Corporation, Tokyo (JP)

(72) Inventor: Tomoaki Takahashi, Matsumoto (JP)

(73) Assignee: Seiko Epson Corporation (JP)

( * ) Notice: Subject to any disclaimer, the term of this patent is extended or adjusted under 35 U.S.C. 154(b) by 319 days.

(21) Appl. No.: 15/194,943

(22) Filed: Jun. 28, 2016

(65) Prior Publication Data

US 2017/0005596 A1   Jan. 5, 2017

(30) Foreign Application Priority Data

Jul. 2, 2015   (JP) .................................. 2015-133503
Jul. 2, 2015   (JP) .................................. 2015-133550

(51) Int. Cl.
*H02N 2/02*     (2006.01)
*H02N 2/00*     (2006.01)
(Continued)

(52) U.S. Cl.
CPC ............ *H02N 2/0075* (2013.01); *B25J 9/123* (2013.01); *B25J 15/0293* (2013.01);
(Continued)

(58) Field of Classification Search
CPC ...... H02N 2/0075; H02N 2/026; H02N 2/004; H02N 2/103; B25J 15/0293; B25J 9/123; H01L 41/0933; H01L 41/094
(Continued)

(56) References Cited

U.S. PATENT DOCUMENTS

2003/0227234 A1\* 12/2003 Namerikawa ......... H01L 41/094
                                                                310/358
2005/0007342 A1\*  1/2005 Cruz-Hernandez ...........................
                                                                B06B 1/0603
                                                                345/161
(Continued)

FOREIGN PATENT DOCUMENTS

JP        03-011983 A    1/1991
JP        04-042788 A    2/1992
JP     2006-238564 A    9/2006

*Primary Examiner* — J. San Martin
(74) *Attorney, Agent, or Firm* — Harness, Dickey & Pierce, P.L.C.

(57) ABSTRACT

The invention relates to a piezoelectric actuator including: a first piezoelectric vibrator including a first diaphragm and first piezoelectric elements that are provided on the first diaphragm and include a first electrode, a second electrode, and a piezoelectric material layer held by the first electrode and the second electrode; a second piezoelectric vibrator including a second diaphragm and second piezoelectric elements that are provided on the second diaphragm and include a first electrode, a second electrode, and a piezoelectric material layer held by the first electrode and the second electrode; and an inductor. The layout of the first piezoelectric vibrator in the first diaphragm is the same as the layout of the second piezoelectric vibrator in the second diaphragm. The positions of the first piezoelectric elements on the first diaphragm correspond to the positions of the second piezoelectric elements on the second diaphragm. The second electrode of the first piezoelectric elements corresponds to the second electrode of the second piezoelectric elements. The corresponding second electrodes are connected via the inductor.

12 Claims, 8 Drawing Sheets

(51) Int. Cl.
 *B25J 9/12* (2006.01)
 *B25J 15/02* (2006.01)
 *H02N 2/10* (2006.01)

(52) U.S. Cl.
 CPC ............ *H02N 2/004* (2013.01); *H02N 2/026* (2013.01); *H02N 2/103* (2013.01)

(58) Field of Classification Search
 USPC ................................... 310/323.16, 330–332
 See application file for complete search history.

(56) References Cited

U.S. PATENT DOCUMENTS

| | | | | |
|---|---|---|---|---|
| 2007/0228887 | A1* | 10/2007 | Nishigaki | B81B 3/0072 310/332 |
| 2012/0043857 | A1* | 2/2012 | Ueda | H01L 41/042 310/330 |
| 2013/0181575 | A1* | 7/2013 | Chen | G01L 1/16 310/314 |
| 2016/0365809 | A1* | 12/2016 | Takahashi | B25J 9/12 |
| 2017/0155038 | A1* | 6/2017 | Caraveo | H01L 41/094 |

* cited by examiner

PIEZOELECTRIC ACTUATOR, MOTOR, ROBOT, AND METHOD OF DRIVING PIEZOELECTRIC ACTUATOR

BACKGROUND

1. Technical Field

The present invention relates to a piezoelectric actuator, a motor, a robot, and a method of driving the piezoelectric actuator.

2. Related Art

A piezoelectric actuator including piezoelectric elements and a motor including the piezoelectric actuator are known. Current consumption increases when driving more than one actuator, and this increases the risk of occurrence of system failure.

As a technique for solving such a problem, for instance, JP-A-2006-238564 discloses a method of driving a piezoelectric actuator. The piezoelectric actuator includes a vibrator that is caused to vibrate by a driving signal having a predetermined frequency and a contact portion that is provided in the vibrator and comes in contact with a driven object. In the piezoelectric actuator, the frequency of a driving signal supplied to each piezoelectric element is swept in a predetermined range, and the driving signal supplied to the piezoelectric element is controlled. Thus, the time at which current consumption reaches the highest value is different for each piezoelectric element.

Moreover, for instance, JP-A-3-11983 discloses an ultrasonic motor that rotates a roller in contact with an elastic plate, using (i) a resonant vibration that is a primary mode longitudinal vibration in the longitudinal direction of the elastic plate and (ii) a resonant vibration that is a higher mode bending vibration in the longitudinal direction. Here, one end portion of the elastic plate is fixed, and another end portion is not fixed.

The method of driving a piezoelectric actuator disclosed in JP-A-2006-238564 can decrease a peak current, but cannot decrease power consumption. Moreover, individual driving circuits for shifting the time at which the current consumption reaches the highest value are necessary. This increases the cost of the driving circuits.

In the ultrasonic motor disclosed in JP-A-3-11983, insufficient stiffness or mass of a fixed portion (support fixture) results in a leak of vibration energy to the side where the fixed portion is provided, and decreases the displacement of the vibrator. Thus, to obtain high output, a large and hard fixed portion are necessary that can suppress the leak of the vibration energy to the side where the fixed portion is provided.

SUMMARY

An advantage of some aspects of the invention is that a piezoelectric actuator, a motor, a robot, and a method of driving the piezoelectric actuator in which power consumption can be reduced in a simple structure are provided.

Another advantage of some aspects of the invention is that a piezoelectric actuator, a motor, and a robot in which high output can be obtained are provided.

Some aspects of the invention solve at least part of the problems described above, and can be achieved as the following embodiments or application examples.

Application Example 1

A piezoelectric actuator according to this application example includes: a first piezoelectric vibrator including a first diaphragm and first piezoelectric elements that are provided on the first diaphragm and include a first electrode, a second electrode, and a piezoelectric material layer held by the first electrode and the second electrode; a second piezoelectric vibrator including a second diaphragm and second piezoelectric elements that are provided on the second diaphragm and include a first electrode, a second electrode, and a piezoelectric material layer held by the first electrode and the second electrode; and an inductor. In the piezoelectric actuator, the layout of the first piezoelectric vibrator in the first diaphragm is the same as the layout of the second piezoelectric vibrator in the second diaphragm. The positions of the first piezoelectric elements on the first diaphragm correspond to the positions of the second piezoelectric elements on the second diaphragm. The second electrode of the first piezoelectric elements corresponds to the second electrode of the second piezoelectric elements. The corresponding second electrodes are connected via the inductor.

According to this application example, appropriate setting of the inductance of the inductor can, for example, cause resonance between the first piezoelectric vibrator and the second piezoelectric vibrator. This allows the first piezoelectric vibrator and the second piezoelectric vibrator to exchange charges. Thus, a power supply only has to supply currents consumed in a connection resistor. Therefore, it is possible to realize the piezoelectric actuator in which power consumption can be reduced in a simple structure.

Moreover, the layouts of the first piezoelectric vibrator and the second piezoelectric vibrator are the same. Thus, even if there is a change in temperature or a change with the passage of time due to driving, the magnitudes of the capacitive components of the first piezoelectric vibrator and the second piezoelectric vibrator are almost the same. This means that the first piezoelectric vibrator and the second piezoelectric vibrator charge and discharge the same charge amount. Accordingly, stable power saving effects can be obtained.

Application Example 2

In the piezoelectric actuator, a phase in which the first piezoelectric vibrator is driven may be opposite to a phase in which the second piezoelectric vibrator is driven.

In this application example, when phases are opposite, the phase difference is, for example, within 180±10 degrees.

According to the application example, charge and discharge can be repeated between the capacitive component of the first piezoelectric vibrator and the capacitive component of the second piezoelectric vibrator. Thus, it is possible to realize the piezoelectric actuator in which power consumption can be reduced.

Application Example 3

In the piezoelectric actuator, the first piezoelectric vibrator and the second piezoelectric vibrator may be driven at a frequency near the anti-resonant point of a parallel resonant circuit that includes (i) the inductor and (ii) the first piezoelectric elements and the second piezoelectric elements connected via the inductor.

In this application example, a frequency near the anti-resonant point is, for example, a frequency within ±10% of the anti-resonant frequency.

According to this application example, impedance viewed from the outside reaches a maximum value at the anti-resonant frequency. This can make an externally inputted current minimal. Thus, it is possible to realize the piezoelectric actuator in which power consumption can be reduced.

Application Example 4

In the piezoelectric actuator, an inductance of the inductor may have a value at which the anti-resonant frequency of the parallel resonant circuit is almost identical to a resonant frequency at which mechanical displacements of the first piezoelectric elements and the second piezoelectric elements reach the maximum.

In this application example, "almost identical" means, for example, the case in which the anti-resonant frequency of the parallel resonant circuit is within ±1% of the resonant frequency at which the mechanical displacements reach the maximum.

According to this application example, it is possible to realize the piezoelectric actuator in which great mechanical work can be performed while reducing power consumption.

Application Example 5

A piezoelectric actuator according to this application example is a piezoelectric actuator in which at least one pair of piezoelectric vibrators having the same shape is fixed to a stationary plate. In the piezoelectric actuator, the piezoelectric vibrators each include; a diaphragm including a fixed portion fixed to the stationary plate, a vibrator in which a piezoelectric element is provided, and a connecting portion connecting the fixed portion and the vibrator; and a contact portion that is attached to or is in contact with the diaphragm, and comes in contact with a driven object. The X direction and the Y direction are parallel to a principal surface of the diaphragm and orthogonal to each other. The Z direction is perpendicular to the principal surface of the diaphragm. The fixed portion, the vibrator, and the contact portion are provided in the X direction. The piezoelectric vibrators having the same shape are driven in phases opposite to each other.

According to this application example, since the piezoelectric vibrators having the same shape are driven in phases opposite to each other, stresses are applied to the stationary plate in opposite directions, thereby cancelling out the stresses. Accordingly, a leak of vibration energy to the stationary plate can be reduced. Thus, it is possible to realize the piezoelectric actuator in which high output can be obtained. Moreover, the size of the stationary plate can be reduced.

Application Example 6

In the piezoelectric actuator, the piezoelectric vibrators having the same shape may be arranged side by side in the Y direction.

According to this application example, since the two piezoelectric vibrators are provided on the same surface of the stationary plate, it is possible to realize the piezoelectric actuator which can be easily manufactured. Moreover, the piezoelectric actuator especially appropriate for linear motors can be realized.

Application Example 7

In the piezoelectric actuator, the fixed portions of the piezoelectric vibrators having the same shape may be integrally formed.

According to this application example, the two piezoelectric vibrators can be manufactured in the same manufacturing process. Thus, variations of the features of the two piezoelectric vibrators can be decreased. Accordingly, the leak of vibration energy to the stationary plate can be further reduced. Thus, it is possible to realize the piezoelectric actuator in which high output can be obtained.

Application Example 8

In the piezoelectric actuator, the piezoelectric element may be provided on the principal surface of the vibrator, and the piezoelectric vibrators having the same shape may be provided on the +Z direction side surface of the stationary plate and on the −Z direction side surface of the stationary plate so that surfaces where the piezoelectric elements of the piezoelectric vibrators are not formed face each other or surfaces where the piezoelectric elements of the piezoelectric vibrators are formed face each other.

According to this application example, if a rotor whose rotation axis is the Y direction is used as the driven object, the contact portion can come in contact with the rotor irrespective of the radius of the rotor. Moreover, it is possible to use two or more piezoelectric actuators arranged in the Y direction. Thus, it is possible to realize the piezoelectric actuator in which high output can be obtained.

Application Example 9

A motor according to this application example includes: the piezoelectric actuator according to any one of the above application examples; and a driven object that is driven by the piezoelectric actuator.

According to this application example, the motor includes, for example, the piezoelectric actuator in which power consumption can be reduced in a simple structure. Thus, it is possible to realize the motor in which power consumption can be reduced in a simple structure.

Application Example 10

A robot according to this application example includes: linkages; a joint connecting the linkages; and the piezoelectric actuator according to any one of the above application examples that drives the joint as a driven object.

According to this application example, the robot includes, for example, the piezoelectric actuator in which power consumption can be reduced in a simple structure. Thus, it is possible to realize the robot in which power consumption can be reduced in a simple structure.

Application Example 11

In a method of driving a piezoelectric actuator according to this application example, the piezoelectric actuator includes: a first piezoelectric vibrator including a first diaphragm and first piezoelectric elements that are provided on the first diaphragm and include a first electrode, a second electrode, and a piezoelectric material layer held by the first electrode and the second electrode; a second piezoelectric vibrator including a second diaphragm and second piezoelectric elements that are provided on the second diaphragm and include a first electrode, a second electrode, and a piezoelectric material layer held by the first electrode and the second electrode; and an inductor. In the piezoelectric actuator, the layout of the first piezoelectric vibrator in the first diaphragm is the same as the layout of the second piezoelectric vibrator in the second diaphragm. The positions of the first piezoelectric elements on the first diaphragm correspond to the positions of the second piezoelectric elements on the second diaphragm. The second electrode of the first piezoelectric elements corresponds to the second electrode of the second piezoelectric elements. The corresponding second electrodes are connected via the inductor. The first piezoelectric vibrator and the second piezoelectric vibrator are driven in phases opposite to each other.

According to the application example, charge and discharge can be repeated between the capacitive component of the first piezoelectric vibrator and the capacitive component of the second piezoelectric vibrator. Thus, it is possible to realize the method of driving a piezoelectric actuator in which power consumption can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following describes preferable embodiments of the invention in detail with reference to the drawings. The drawings referred to below are used for convenience' sake. It should be noted that the following embodiments do not intend to unreasonably limit the invention recited in Claims. Moreover, not all the components described below are essential structural components of the invention.

1. Piezoelectric Actuator and Method of Driving Piezoelectric Actuator 1-1. Embodiment 1

Figure 1:
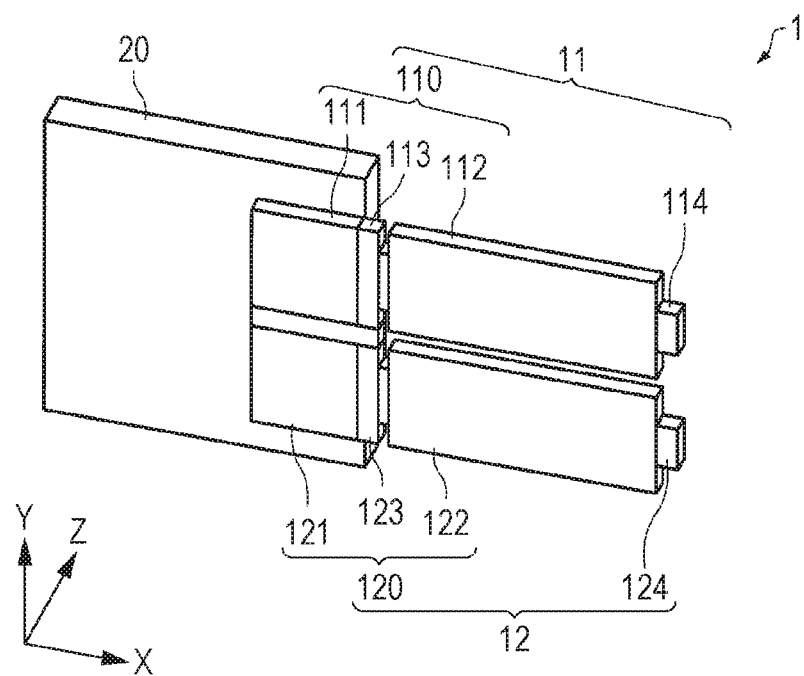
FIG. 1 is a perspective view schematically illustrating a piezoelectric actuator according to Embodiment 1.

FIG. 1 is a perspective view schematically illustrating a piezoelectric actuator 1 according to Embodiment 1.

The piezoelectric actuator 1 according to Embodiment 1 includes a first piezoelectric vibrator 11, a second piezoelectric vibrator 12, and inductors described later. In the example of FIG. 1, at least one pair of the first piezoelectric vibrator 11 and the second piezoelectric vibrator 12 having the same shape are fixed to a stationary plate 20. The example of FIG. 1 illustrates a pair of the first piezoelectric vibrator 11 and the second piezoelectric vibrator 12 having the same shape. However, two or more pairs may be provided. It is preferable that the stationary plate 20 be made of a high stiffness material such as stainless steel.

The first piezoelectric vibrator 11 includes a first diaphragm 110 and a contact portion 114. The first diaphragm 110 includes a fixed portion 111, a vibrator 112, and a connecting portion 113. The fixed portion 111 is fixed to the stationary plate 20. In the vibrator 112, more than one piezoelectric element is provided. The connecting portion 113 connects the fixed portion 111 and the vibrator 112 to each other. The contact portion 114 is attached to or is in contact with the first diaphragm 110, and comes in contact with a driven object.

The second piezoelectric vibrator 12 includes a second diaphragm 120 and a contact portion 124. The second diaphragm 120 includes a fixed portion 121, a vibrator 122, and a connecting portion 123. The fixed portion 121 is fixed to the stationary plate 20. In the vibrator 122, more than one piezoelectric element is provided. The connecting portion 123 connects the fixed portion 121 and the vibrator 122 to each other. The contact portion 124 is attached to or is in contact with the second diaphragm 120, and comes in contact with the driven object.

The contact portion 114 and the contact portion 124 are components for coming in contact with the driven object and applying a force to the driven object. It is preferable that the contact portion 114 and the contact portion 124 be made of a durable material such as a ceramic (e.g., $Al_2O_3$).

In the example of FIG. 1, the X direction and the Y direction are orthogonal to each other and parallel to the principal surfaces of the first diaphragm 110 and the second diaphragm 120. The Z direction is perpendicular to the principal surfaces of the first diaphragm 110 and the second diaphragm 120.

In the example of FIG. 1, when the first diaphragm 110 and the contact portion 114 are viewed in the Y direction, the fixed portion 111, the connecting portion 113, the vibrator 112, and the contact portion 114 are provided in this order in the X direction. This can apply a great force to the driven object.

In the example of FIG. 1, when the second diaphragm 120 and the contact portion 124 are viewed in the Y direction, the fixed portion 121, the connecting portion 123, the vibrator 122, and the contact portion 124 are provided in this order in the X direction. This can apply a great force to the driven object.

Figure 2:
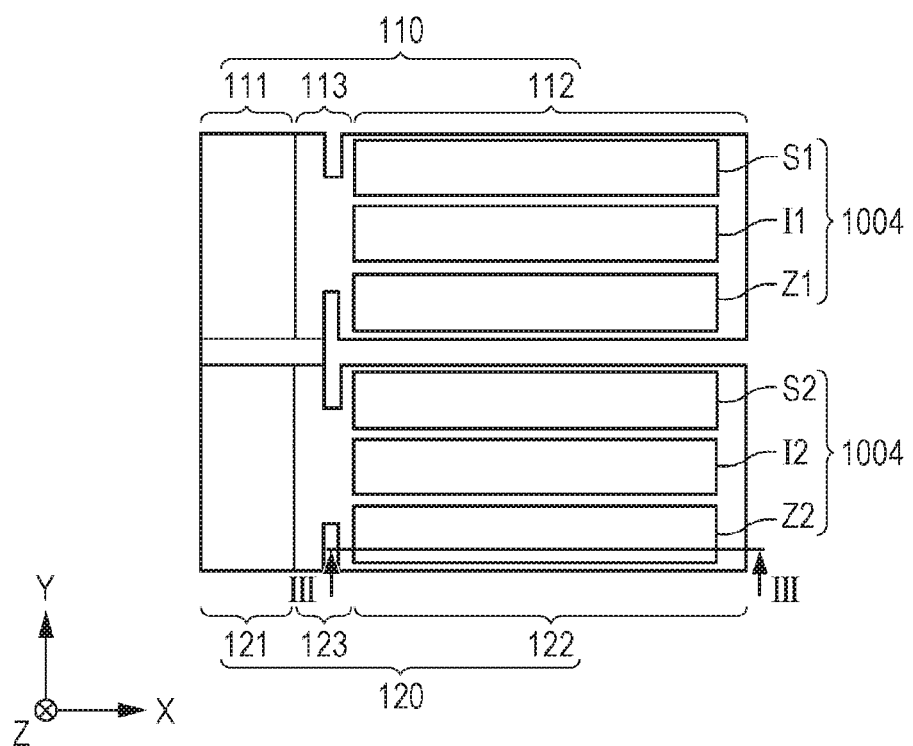
FIG. 2 is a plan view schematically illustrating diaphragms.
Figure 3:
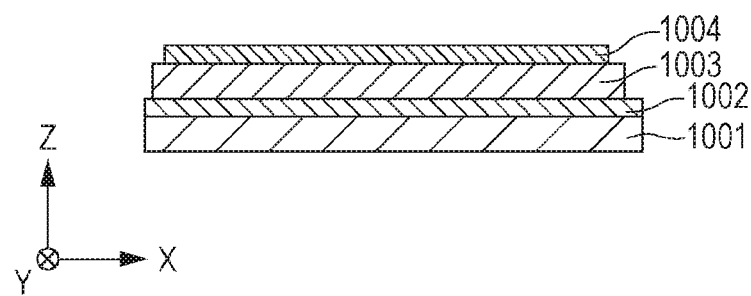
FIG. 3 is a cross-sectional view of a piezoelectric vibrator taken along the line III-III of FIG. 2.

FIG. 2 is a plan view schematically illustrating the first diaphragm 110 and the second diaphragm 120. FIG. 3 is a cross-sectional view illustrating the second piezoelectric vibrator 12 taken along the line III-III of FIG. 2.

The first piezoelectric vibrator 11 and the second piezoelectric vibrator 12 include a substrate 1001, a first electrode 1002 on the substrate 1001, a piezoelectric material 1003 on the first electrode 1002, and second electrodes 1004 on the piezoelectric material 1003. The substrate 1001 corresponds to the first diaphragm 110 in the first piezoelectric vibrator 11 and the second diaphragm 120 in the second piezoelectric vibrator 12. The piezoelectric material 1003 is held by the first electrode 1002 and the second electrodes 1004.

The substrate 1001 is used in the process of forming the films of the first electrode 1002, the piezoelectric material 1003, and the second electrodes 1004. Moreover, the substrate 1001 also functions as a diaphragm that performs mechanical vibrations. The substrate 1001 is made of, for example, Si, $Al_2O_3$, or $ZrO_2$. For instance, an Si wafer for manufacturing a semiconductor can be used as the substrate 1001 made of Si. In the present embodiment, the plan view shape of the substrate 1001 is rectangular. It is preferable that the thickness of the substrate 1001 range, for example, from at least 10 μm to 700 μm or less. If the thickness of the substrate 1001 is at least 10 μm, the substrate 1001 can be relatively easily handled in the process of forming the films above the substrate 1001. Moreover, if the thickness of the substrate 1001 is 700 μm or less, the substrate 1001 can be easily vibrated in response to the expansion and contraction of the piezoelectric material 1003 of a thin film.

The first electrode 1002 is a continuous conductor layer formed on the substrate 1001. Meanwhile, as FIG. 2 illustrates, the second electrodes 1004 are separated into six conductor layers, and the six layers each constitute a part of first piezoelectric elements or a part of second piezoelectric elements. The six layers are an electrode S1, an electrode I1, an electrode Z1, an electrode S2, an electrode I2, and an electrode Z2. More specifically, the electrode S1, the electrode I1, and the electrode Z1 each constitute a part of the first piezoelectric elements. The first piezoelectric vibrator 11 includes three first piezoelectric elements. Likewise, the electrode S2, the electrode I2, and the electrode Z2 each constitute a part of the second piezoelectric elements. The second piezoelectric vibrator 12 includes three second piezoelectric elements. As FIG. 2 illustrates, the layout of the first piezoelectric vibrator 11 in the first diaphragm 110 and the layout of the second piezoelectric vibrator 12 in the second diaphragm 120 are the same.

In the example of FIG. 2, the plan view shapes of the first electrode 1002 and the second electrodes 1004 are rectangular. The first electrode 1002 and the second electrodes 1004 are thin films formed by, for example, sputtering. The first electrode 1002 and the second electrodes 1004 can be formed of any high conductive material such as aluminum (Al), nickel (Ni), gold (Au), platinum (Pt), or iridium (Ir). It should be noted that the first electrode 1002 is not necessarily a continuous conductor layer, but may be separated into six conductor layers made up of two sets of three conductor layers each having a plan view shape virtually the same as that of the second electrode 1004. It should be noted that wiring (or a wiring layer and an insulating layer) for electrically connecting the second electrodes 1004 is not illustrated in FIGS. 2 and 3. Likewise, wiring (or a wiring layer and an insulating layer) for electrically connecting the first electrode 1002 and the driving circuit and for electrically connecting the second electrodes 1004 and the driving circuit is not illustrated in FIGS. 2 and 3.

The piezoelectric material 1003 includes six piezoelectric material layers made up of two sets of three piezoelectric material layers each having a plan view shape virtually the same as that of the second electrode 1004. Instead, the piezoelectric material 1003 may be a continuous piezoelectric material layer having a plan view shape virtually the same as that of the first electrode 1002. The stacking structure of the first electrode 1002, the piezoelectric material 1003, and the second electrodes 1004 constitutes the first piezoelectric vibrator 11 and the second piezoelectric vibrator 12 each including the three piezoelectric elements.

The piezoelectric material 1003 is a thin film formed by, for example, a sol-gel or sputtering process. The piezoelectric material 1003 can be formed of any material having a piezoelectric effect, such as a ceramic having the $ABO_3$ perovskite structure. As the ceramic having the $ABO_3$ perovskite structure, for instance, lead zirconate titanate (PZT), barium titanate, lead titanate, potassium niobate, lithium niobate, lithium tantalate, sodium tungstate, zinc oxide, barium strontium titanate (BST), strontium bismuth tantalite (SBT), lead metaniobate, lead zinc niobate, or lead scandium niobate can be used. Moreover, a material having a piezoelectric effect, other than the ceramic can be used. For instance, polyvinylidene fluoride, crystal, or the like can be used. It is preferable that the thickness of the piezoelectric material 1003 range, for example, from at least 50 nm (0.05 μm) to 20 μm or less. The thin film of the piezoelectric material 1003 having a thickness in this range can be easily formed using the film formation process. If the thickness of the piezoelectric material 1003 is at least 0.05 μm, a sufficiently large force can be generated in response to the expansion and contraction of the piezoelectric material 1003. Moreover, if the thickness of the piezoelectric material 1003 is 20 μm or less, the piezoelectric actuator 1 can be sufficiently miniaturized.

There are three examples of a method of driving electrodes to cause elliptic motion of the contact portion 114 so as to rotate a roller that is in contact with the contact portion 114. These examples can be also applied to the contact portion 124.

(1) In normal rotation, only the electrode S1 and the electrode I1 are driven. In reverse rotation, only the electrode I1 and the electrode Z1 are driven.

(2) In the normal rotation, the electrode S1 and the electrode I1 are driven in the same phase, and the electrode Z1 is driven in a different phase. In the reverse rotation, the electrode I1 and the electrode Z1 are driven in the same phase, and the electrode S1 is driven in a different phase. Representative different phases are, for example, +90 degrees and +180 degrees.

(3) In the normal rotation, the electrode S1 is driven at +90 degrees relative to the electrode I1, and the electrode Z1 is driven at −90 degrees relative to the electrode I1. In the reverse rotation, the S1 is driven at −90 degrees relative to the electrode I1, and the electrode Z1 is driven at +90 degrees relative to the electrode I1.

The driving method (2) described above is referred to below. However, the invention is also applicable to driving methods (1) and (3).

Figure 4:
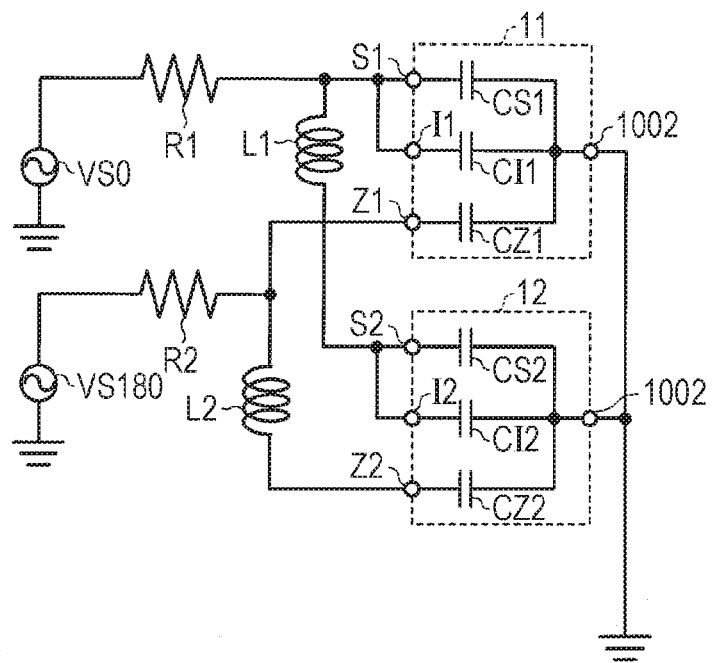
FIG. 4 is a circuit diagram of a driving circuit for driving a first piezoelectric vibrator and a second piezoelectric vibrator.

FIG. 4 is a circuit diagram of a driving circuit for driving the first piezoelectric vibrator 11 and the second piezoelectric vibrator 12.

In FIG. 4, an AC voltage outputted from a power supply VS0 and an AC voltage outputted from a power supply VS180 have a phase difference of 180 degrees.

As described later, in the present embodiment, the positions of the first piezoelectric elements on the first diaphragm 110 correspond to the positions of the second piezoelectric elements on the second diaphragm 120. The second electrode 1004 of the first piezoelectric elements corresponds to the second electrode 1004 of the second piezoelectric elements. The corresponding second electrodes 1004 are connected via the inductors.

The AC voltage from the power supply VS0 is inputted to the electrode S1 and the electrode I1 of the first piezoelectric vibrator 11 via a resistor R1. The AC voltage from the power supply VS180 is inputted to the electrode Z1 of the first piezoelectric vibrator 11 via a resistor R2.

The AC voltage from the power supply VS0 is inputted to the electrode S2 and the electrode I2 of the second piezoelectric vibrator 12 via the resistor R1 and an inductor L1. The AC voltage from the power supply VS180 is inputted to the electrode Z2 of the second piezoelectric vibrator 12 via the resistor R2 and an inductor L2.

That is, the electrode S1 and the electrode S2 are connected via the inductor L1. The electrode I1 and the electrode 12 are connected via the inductor L1. The electrode Z1 and the electrode Z2 are connected via the inductor L2.

A common ground potential is inputted to the first electrodes 1002 of the first piezoelectric vibrator 11 and the second piezoelectric vibrator 12.

In the example of FIG. 4, when the piezoelectric material 1003 near the electrode S1 and the electrode I1 of the first piezoelectric vibrator 11 expands, the piezoelectric material 1003 near the electrode Z1 of the first piezoelectric vibrator 11 contracts. In contrast, when the piezoelectric material 1003 near the electrode S1 and the electrode I1 of the first piezoelectric vibrator 11 contracts, the piezoelectric material 1003 near the electrode Z1 of the first piezoelectric vibrator 11 expands.

In the example of FIG. 4, when the piezoelectric material 1003 near the electrode S2 and the electrode 12 of the second piezoelectric vibrator 12 expands, the piezoelectric material 1003 near the electrode Z2 of the second piezoelectric vibrator 12 contracts. In contrast, when the piezoelectric material 1003 near the electrode S2 and the electrode 12 of the second piezoelectric vibrator 12 contracts, the piezoelectric material 1003 near the electrode Z2 of the second piezoelectric vibrator 12 expands.

In the present embodiment, appropriate settings of the inductances of the inductor L1 and the inductor L2 can, for example, cause resonance between the first piezoelectric vibrator 11 and the second piezoelectric vibrator 12. This allows the first piezoelectric vibrator 11 and the second piezoelectric vibrator 12 to exchange charges. Thus, the power supplies only have to supply currents consumed in the connection resistors. This can realize the piezoelectric actuator 1 in which power consumption can be reduced in a simple structure.

Moreover, the layouts of the first piezoelectric vibrator 11 and the second piezoelectric vibrator 12 are the same. Thus, even if there is a change in temperature or a change with the passage of time due to driving, the magnitudes of the capacitive components of the first piezoelectric vibrator 11 and the second piezoelectric vibrator 12 are almost the same. That is, the first piezoelectric vibrator 11 and the second piezoelectric vibrator 12 charge and discharge the same charge amount. Accordingly, stable power saving effects can be obtained.

In the present embodiment, a phase in which the first piezoelectric vibrator 11 is driven may be opposite to a phase in which the second piezoelectric vibrator 12 is driven.

In the present embodiment, when phases are opposite, the phase difference is, for example, within 180±10 degrees.

In the present embodiment, charge and discharge can be repeated between the capacitive component of the first piezoelectric vibrator 11 and the capacitive component of the second piezoelectric vibrator 12. Thus, it is possible to realize the piezoelectric actuator 1 and the method of driving the piezoelectric actuator 1 in which power consumption can be reduced.

In the present embodiment, the first piezoelectric vibrator 11 and the second piezoelectric vibrator 12 may be driven at a frequency near the anti-resonant point of the parallel resonant circuit including the inductors (the inductor L1 and the inductor L2) and the first piezoelectric elements and the second piezoelectric elements connected via the inductors.

In the present embodiment, the frequency near the anti-resonant point is, for example, a frequency within ±10% of the anti-resonant frequency.

According to the present embodiment, impedance viewed from the outside reaches a maximum value at the anti-resonant frequency. This can make an externally inputted current minimal. Accordingly, it is possible to realize the piezoelectric actuator 1 and the method of driving the piezoelectric actuator 1 in which power consumption can be reduced.

In the present embodiment, the inductances of the inductor L1 and the inductor L2 may have values at which the anti-resonant frequency of the parallel resonant circuit is almost identical to a resonant frequency at which mechanical displacements of the first piezoelectric elements and the second piezoelectric elements reach the maximum.

In the present embodiment, "almost identical" means, for example, the case in which the anti-resonant frequency of the parallel resonant circuit is within ±1% of the resonant frequency at which mechanical displacements reach the maximum.

In the present embodiment, it is possible to realize the piezoelectric actuator 1 and the method of driving the piezoelectric actuator 1 in which a great mechanical work can be performed while reducing power consumption.

1-2. Embodiment 2

In the present embodiment, a first piezoelectric vibrator 11 and a second piezoelectric vibrator 12 having the same shape are driven in phases opposite to each other.

Figure 5:
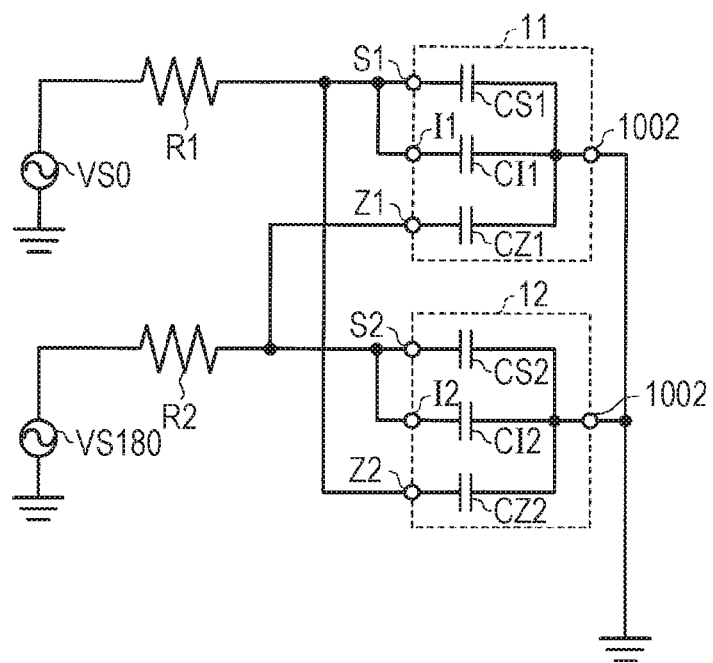
FIG. 5 is a circuit diagram of a driving circuit for driving a first piezoelectric vibrator and a second piezoelectric vibrator.

FIG. 5 is a circuit diagram of a driving circuit for driving the first piezoelectric vibrator 11 and the second piezoelectric vibrator 12 in a piezoelectric actuator 2 according to Embodiment 2. The identical reference signs are used to designate components of the piezoelectric actuator 2 that are similar to those of the piezoelectric actuator 1 according to Embodiment 1, and detailed explanations are omitted.

In FIG. 5, an AC voltage outputted from a power supply VS0 and an AC voltage outputted from a power supply VS180 have a phase difference of 180 degrees.

The AC voltage from the power supply VS0 is inputted to an electrode S1 and an electrode I1 of the first piezoelectric vibrator 11 via a resistor R1. The AC voltage from the power supply VS180 is inputted to an electrode Z1 via a resistor R2.

The AC voltage from the power supply VS180 is inputted to an electrode S2 and an electrode 12 of the second piezoelectric vibrator 12 via the resistor R2. The AC voltage from the power supply VS0 is inputted to an electrode Z2 of the second piezoelectric vibrator 12 via the resistor R1.

A common ground potential is inputted to first electrodes 1002 of the first piezoelectric vibrator 11 and the second piezoelectric vibrator 12.

In the example of FIG. 5, when a piezoelectric material 1003 near the electrode S1 and the electrode I1 of the first piezoelectric vibrator 11 expands, the piezoelectric material 1003 near the electrode Z1 of the first piezoelectric vibrator 11 contracts. In contrast, when the piezoelectric material 1003 near the electrode S1 and the electrode I1 of the first piezoelectric vibrator 11 contracts, the piezoelectric material 1003 near the electrode Z1 of the first piezoelectric vibrator 11 expands.

In the example of FIG. 5, when the piezoelectric material 1003 near the electrode S2 and the electrode 12 of the second piezoelectric vibrator 12 expands, the piezoelectric material 1003 near the electrode Z2 of the second piezoelectric vibrator 12 contracts. In contrast, when the piezoelectric material 1003 near the electrode S2 and the electrode 12 of the second piezoelectric vibrator 12 contracts, the piezoelectric material 1003 near the electrode Z2 of the second piezoelectric vibrator 12 expands.

Figure 6:
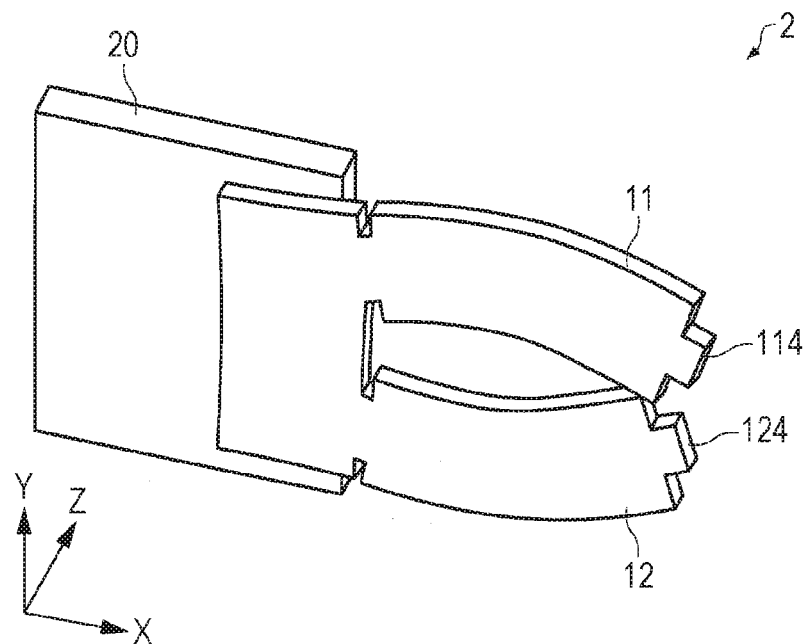
FIG. 6 is a perspective view schematically illustrating the operation of a piezoelectric actuator according to Embodiment 2.

FIG. 6 is a perspective view schematically illustrating the operation of the piezoelectric actuator 2 according to Embodiment 2. In FIG. 6, the degrees of the curves of the first piezoelectric vibrator 11 and the second piezoelectric vibrator 12 are exaggerated.

In the example of FIG. 6, the piezoelectric material 1003 near the electrode S1 and the electrode I1 of the first piezoelectric vibrator 11 is expanded, and the piezoelectric material 1003 near the electrode Z1 of the first piezoelectric vibrator 11 is contracted. Moreover, the piezoelectric material 1003 near the electrode S2 and the electrode 12 of the second piezoelectric vibrator 12 is contracted, and the piezoelectric material 1003 near the electrode Z2 of the second piezoelectric vibrator 12 is expanded.

The expansion and contraction of the first piezoelectric vibrator 11 makes the contact portion 114 draw an elliptical path within the X-Y plane. Moreover, the expansion and contraction of the second piezoelectric vibrator 12 makes the contact portion 124 draw an elliptical path within the X-Y plane. The movements can move a driven object that is in contact with the contact portion 114 or the contact portion 124, in the Y direction.

In the present embodiment, the first piezoelectric vibrator 11 and the second piezoelectric vibrator 12 having the same shape are driven in phases opposite to each other. Thus, stresses are applied to a stationary plate 20 in opposite directions, thereby cancelling out the stresses. Accordingly, a leak of vibration energy to the stationary plate 20 can be reduced. Thus, it is possible to realize the piezoelectric actuator 2 in which high output can be obtained. Moreover, the volume and mass of the stationary plate 20 can be reduced.

In the present embodiment, the first piezoelectric vibrator 11 and the second piezoelectric vibrator 12 having the same shape are arranged side by side in the Y direction.

In the present embodiment, the first piezoelectric vibrator 11 and the second piezoelectric vibrator 12 are provided in the plane where the stationary plate 20 is provided. Thus, it is possible to realize the piezoelectric actuator 2 which can be easily manufactured. Moreover, the piezoelectric actuator 2 especially appropriate for linear motors can be realized.

In the present embodiment, a fixed portion 111 of the first piezoelectric vibrator 11 and a fixed portion 121 of the second piezoelectric vibrator 12 have the same shape and are integrally formed.

In the present embodiment, the first piezoelectric vibrator 11 and the second piezoelectric vibrator 12 can be manufactured in the same manufacturing process. This can decrease variations of the features of the first piezoelectric vibrator 11 and the second piezoelectric vibrator 12. Accordingly, the leak of vibration energy to the stationary plate 20 can be further reduced. Thus, it is possible to realize the piezoelectric actuator 2 in which high output can be obtained.

1-3. Embodiment 3

Figure 7:
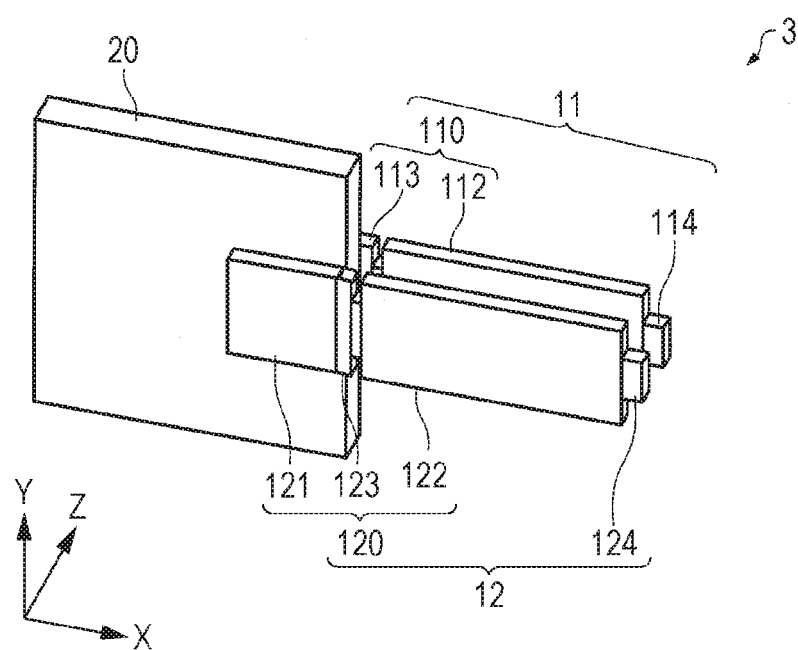
FIG. 7 is a perspective view schematically illustrating a piezoelectric actuator according to Embodiment 3.

FIG. 7 is a perspective view schematically illustrating a piezoelectric actuator 3 according to Embodiment 3. The identical reference signs are used to designate components of the piezoelectric actuator 3 similar to those of the piezoelectric actuator 1 according to Embodiment 1 and those of the piezoelectric actuator 2 according to Embodiment 2, and detailed explanations are omitted.

The piezoelectric actuator 3 according to Embodiment 3 is different from the piezoelectric actuator 2 in the positions of a first piezoelectric vibrator 11 and a second piezoelectric vibrator 12 relative to a stationary plate 20. The other structure is similar to that of the piezoelectric actuator 2.

A stacking structure for the first piezoelectric vibrator 11 and the second piezoelectric vibrator 12 are similar to the stacking structure in FIG. 3. In a second electrode 1004 of the first piezoelectric vibrator 11, an electrode Z1, an electrode I1, and an electrode S1 are provided in this order in the +Y direction. In a second electrode 1004 of the second piezoelectric vibrator 12, an electrode Z2, an electrode 12, and an electrode S2 are provided in this order in the +Y direction. A driving circuit for driving the first piezoelectric vibrator 11 and the second piezoelectric vibrator 12 has the same configuration as that in FIG. 5.

In the present embodiment, piezoelectric elements provided in the first piezoelectric vibrator 11 are provided on one of the principal surfaces of a vibrator 112 of a first diaphragm 110. Moreover, piezoelectric elements provided in the second piezoelectric vibrator 12 are provided on one of the principal surfaces of a vibrator 122 of a second diaphragm 120.

The first piezoelectric vibrator 11 and the second piezoelectric vibrator 12 having the same shape are provided on the +Z direction side surface and on the −Z direction side surface so that surfaces where the piezoelectric elements of the first piezoelectric vibrator 11 and the second piezoelectric vibrator 12 are not formed face each other or surfaces where the piezoelectric elements are formed face each other.

Figure 8:
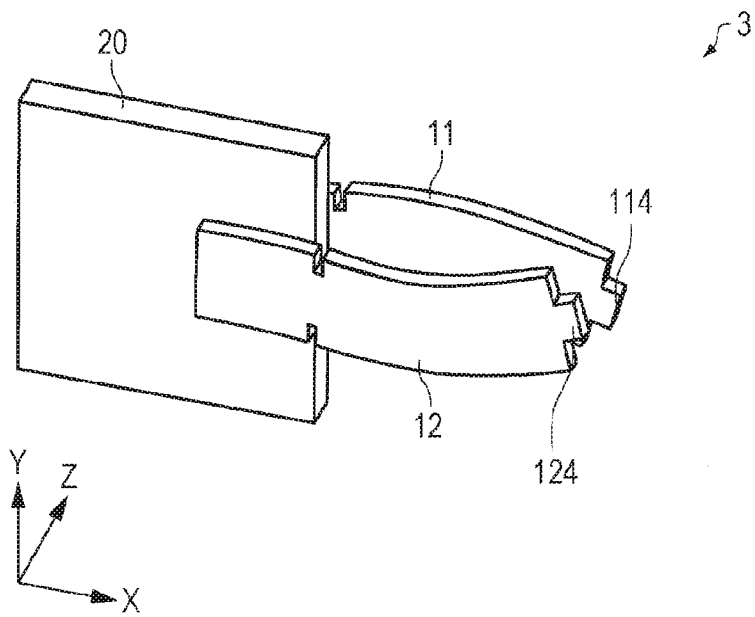
FIG. 8 is a perspective view schematically illustrating the operation of the piezoelectric actuator according to Embodiment 3.

FIG. 8 is a perspective view schematically illustrating the operation of the piezoelectric actuator 3 according to Embodiment 3. In FIG. 8, the degrees of the curves of the first piezoelectric vibrator 11 and the second piezoelectric vibrator 12 are exaggerated.

In the example of FIG. 8, the piezoelectric material 1003 near the electrode S1 and the electrode I1 of the first piezoelectric vibrator 11 is expanded, and the piezoelectric material 1003 near the electrode Z1 of the first piezoelectric vibrator 11 is contracted. Moreover, the piezoelectric material 1003 near the electrode S2 and the electrode 12 of the second piezoelectric vibrator 12 is contracted, and the piezoelectric material 1003 near the electrode Z2 of the second piezoelectric vibrator 12 is expanded.

The expansion and contraction of the first piezoelectric vibrator 11 makes the contact portion 114 draw an elliptical path within the X-Y plane. Moreover, the expansion and contraction of the second piezoelectric vibrator 12 makes the contact portion 124 draw an elliptical path within the X-Y plane. The movements can move a driven object that is in contact with the contact portion 114 or the contact portion 124, in the Y direction.

Also in the present embodiment, the first piezoelectric vibrator 11 and the second piezoelectric vibrator 12 having the same shape are driven in phases opposite to each other. Thus, stresses are applied to a stationary plate 20 in opposite directions, thereby cancelling out the stresses. Accordingly, a leak of vibration energy to the stationary plate 20 can be reduced. Thus, it is possible to realize the piezoelectric actuator 3 in which high output can be obtained. Moreover, the volume and mass of the stationary plate 20 can be reduced.

According to the present embodiment, if a rotor whose rotation axis is the Y direction is used as the driven object, the contact portion 114 or the contact portion 124 can come in contact with the rotor irrespective of the radius of the rotor. Moreover, two or more piezoelectric actuators 3 arranged in the Y direction can be used. Thus, it is possible to realize the piezoelectric actuator 3 in which high output can be obtained.

1-4. Simulation Example

Table 1 illustrates the results of simulation by a finite element method. The material of the stationary plate is stainless steel. The size in the X direction is 5 mm, the size in the Y direction is 5 mm, and the size in the Z direction is 1 mm. Moreover, the material of the piezoelectric vibrators is silicon. The size in the X direction is 2.5 mm, the size in the Y direction is 1 mm, and the size in the Z direction is 0.2 mm.

In Table 1, tip displacement percentage and output indicate relative values when values for one piezoelectric vibrator are 100%. "Two in Same Plane" for piezoelectric vibrator means the structure in FIG. 1. "Two on Opposite Sides" means the structure in FIG. 7. When the phase is "Same" phase, a phase difference between the power supply VS0 and the power supply VS180 of the driving circuit in FIG. 5 is 0 degree. For "Opposite" phase, the phase difference is 180 degrees.

TABLE 1

| Piezoelectric Vibrator | Phase | Tip Displacement Percentage (%) | | | |
|---|---|---|---|---|---|
| | | X direction | Y direction | X direction × Y direction | Output (%) |
| One | N/A | 100 | 100 | 100 | 100 |
| Two in Same Plane | Same | 90 | 98 | 89 | 178 |
| | Opposite | 107 | 98 | 105 | 210 |
| Two on Opposite Sides | Same | 96 | 98 | 94 | 188 |
| | Opposite | 101 | 102 | 103 | 206 |

As Table 1 shows, for the same phase, even if two piezoelectric vibrators are used, the outputs each fall below 200%. Meanwhile, for the opposite phase, the outputs each exceed 200%. Accordingly, the results show that it is possible to realize a piezoelectric actuator in which high output can be obtained by driving the two piezoelectric vibrators in phases opposite to each other.

2. Motor

Figure 9:
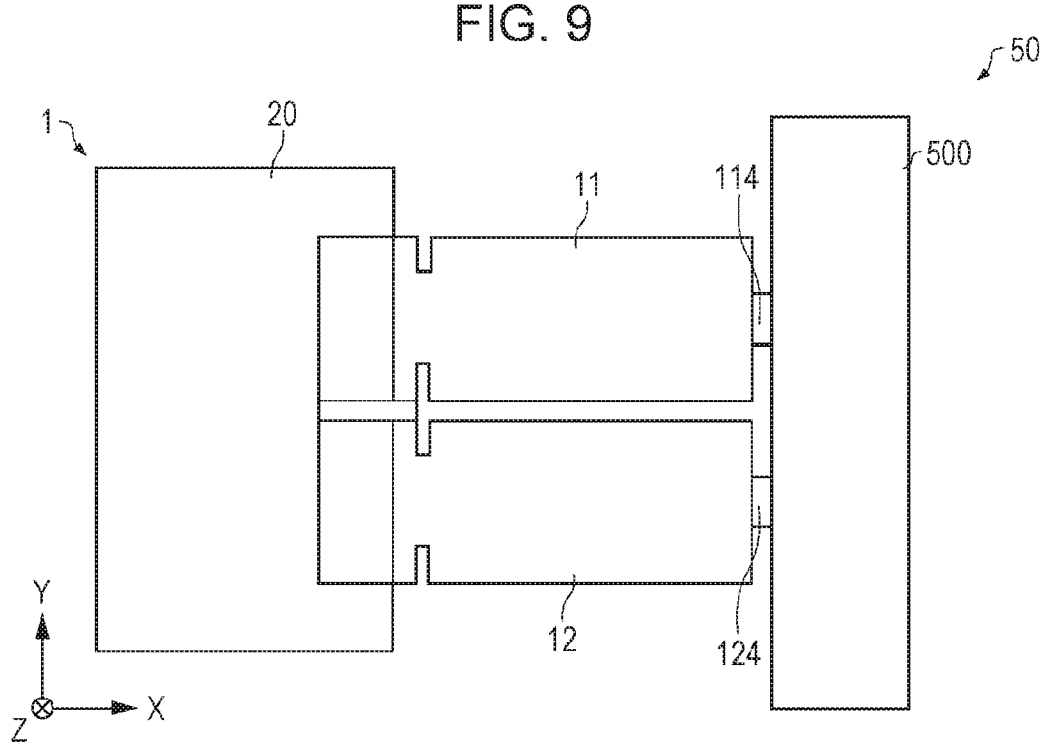
FIG. 9 is a plan view schematically illustrating a motor according to another embodiment.

FIG. 9 is a plan view schematically illustrating a motor 50 according to the present embodiment.

The motor 50 according to the present embodiment includes the piezoelectric actuator 1 and a driven object 500. In the example of FIG. 9, the motor 50 is a linear motor that linearly moves the driven object 500. The driven object 500 is provided so as to come in contact with at least one of the contact portion 114 and the contact portion 124 during the operation of the piezoelectric actuator 1. The piezoelectric actuator 1 can move the driven object 500 in the Y direction by the expansion and contraction of the first piezoelectric vibrator 11 and the second piezoelectric vibrator 12. It should be noted that the driven object 500 may be a rotor that rotationally moves.

In the present embodiment, the motor 50 includes the piezoelectric actuator 1 in which power consumption can be reduced in a simple structure. Thus, it is possible to realize the motor 50 in which power consumption can be reduced in a simple structure.

It should be noted that the motor 50 according to the present embodiment may include the piezoelectric actuator 2 or the piezoelectric actuator 3 instead of the piezoelectric actuator 1. In this case, according to the present embodiment, since the motor 50 includes the piezoelectric actuator 2 or the piezoelectric actuator 3 in which high output can be obtained, it is possible to realize the motor 50 in which high output can be obtained.

3. Robot

Figure 10:
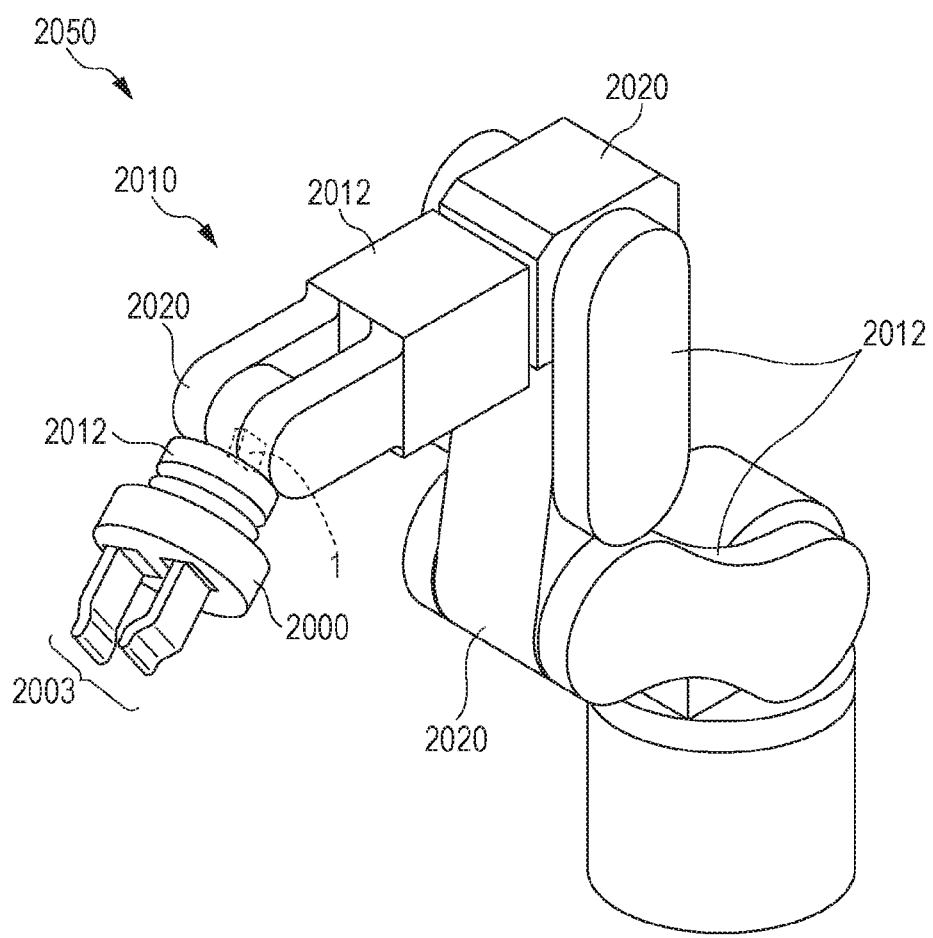
FIG. 10 illustrates an example of a robot including the piezoelectric actuator.

FIG. 10 illustrates an example of a robot 2050 including the piezoelectric actuator 1. The robot includes an arm 2010. The arm 2010 includes linkages 2012 (also referred to as "link members") and joints 2020 that connect the linkages 2012 in a state in which the joints 2020 can be rotated or bended. The joints 2020 each include the piezoelectric actuator 1, and the piezoelectric actuators 1 drive the joints 2020 as driven objects. In the present embodiment, the joints 2020 can be rotated or bended by any degrees using the piezoelectric actuators 1. A robot hand 2000 is attached to the tip of the arm 2010. The robot hand 2000 includes holding portions 2003 that constitute a pair. The robot hand 2000 also includes the piezoelectric actuator 1. An object can be held by spreading and closing the separation between the holding portions 2003, using the piezoelectric actuator 1. Moreover, the piezoelectric actuator 1 is also provided between the robot hand 2000 and the arm 2010, and the robot hand 2000 can be rotated relative to the arm 2010, using the piezoelectric actuator 1.

Figure 11:
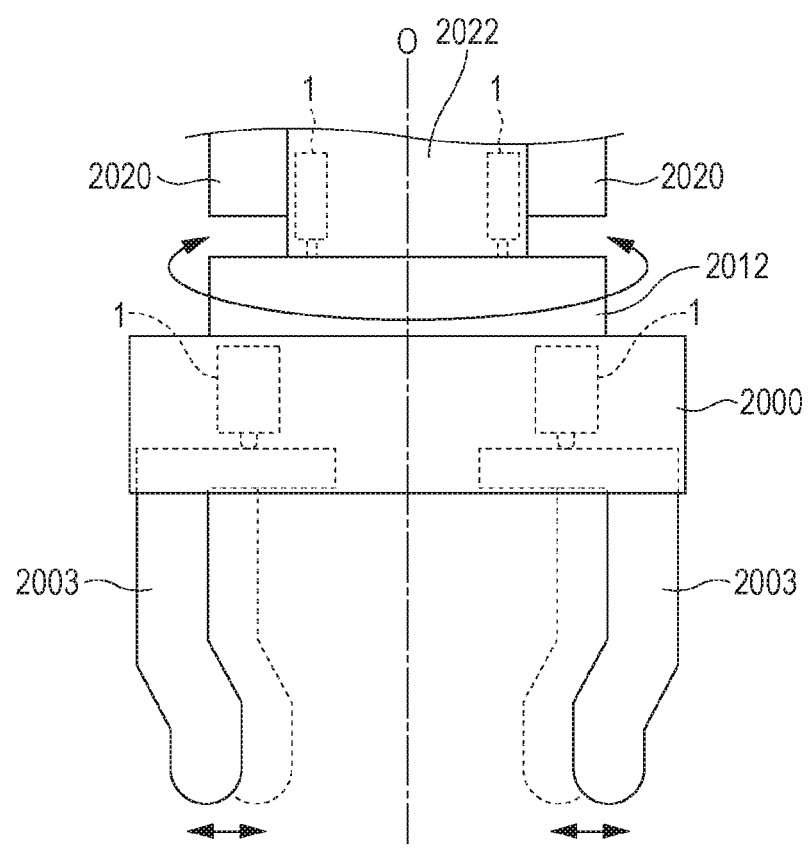
FIG. 11 illustrates the wrist of the robot.

FIG. 11 illustrates the wrist of the robot 2050 in FIG. 10. The joints 2020 of the wrist hold a wrist rotation unit 2022. The linkage 2012 of the wrist is attached to the wrist rotation unit 2022 so that the linkage 2012 can be rotated around a central axis O of the wrist rotation unit 2022. The wrist rotation unit 2022 includes the piezoelectric actuators 1, which rotate the linkage 2012 of the wrist and the robot hand 2000 around the central axis O. The holding portions 2003 are attached to the robot hand 2000. The base end portions of the holding portions 2003 are moveable in the robot hand 2000, and the piezoelectric actuators 1 are installed to the base portions of the holding portions 2003. Thus, the operation of the piezoelectric actuators 1 allows the holding portions 2003 to move and hold an object.

It should be noted that the piezoelectric actuators 1 are applicable not only to the robot 2050 having one arm, but also to the robot 2050 having two or more arms. Here, the joints 2020 of the wrist and the robot hand 2000 often include various devices (not illustrated) such as a force sensor and a gyrosensor, in addition to the piezoelectric actuators 1. Power is supplied also to these devices. In the piezoelectric actuator 1, power consumption can be reduced in a simple structure. Thus, it is possible to realize the robot 2050 in which power consumption can be reduced in a simple structure.

Moreover, the robot 2050 according to the present embodiment may include the piezoelectric actuator 2 or the piezoelectric actuator 3 instead of the piezoelectric actuator 1. The joints 2020 of the wrist and the robot hand 2000 include, for example, a power line for supplying power to the devices such as the force sensor and the gyrosensor and a signal line for transmitting signals. Thus, great many lines are necessary. However, it has been extremely difficult to provide lines in the joints 2020 and the robot hand 2000. However, the piezoelectric actuator 2 and the piezoelectric actuator 3 can obtain output higher than that obtained by a general electric motor or a conventional piezoelectric actuator. In addition, the piezoelectric actuator 2 and the piezoelectric actuator 3 can be made smaller than these devices. Accordingly, the lines can be provided in small spaces such as joints 2020 (especially, the joints at the tip of the arm 2010) and the robot hand 2000.

Figure 12:
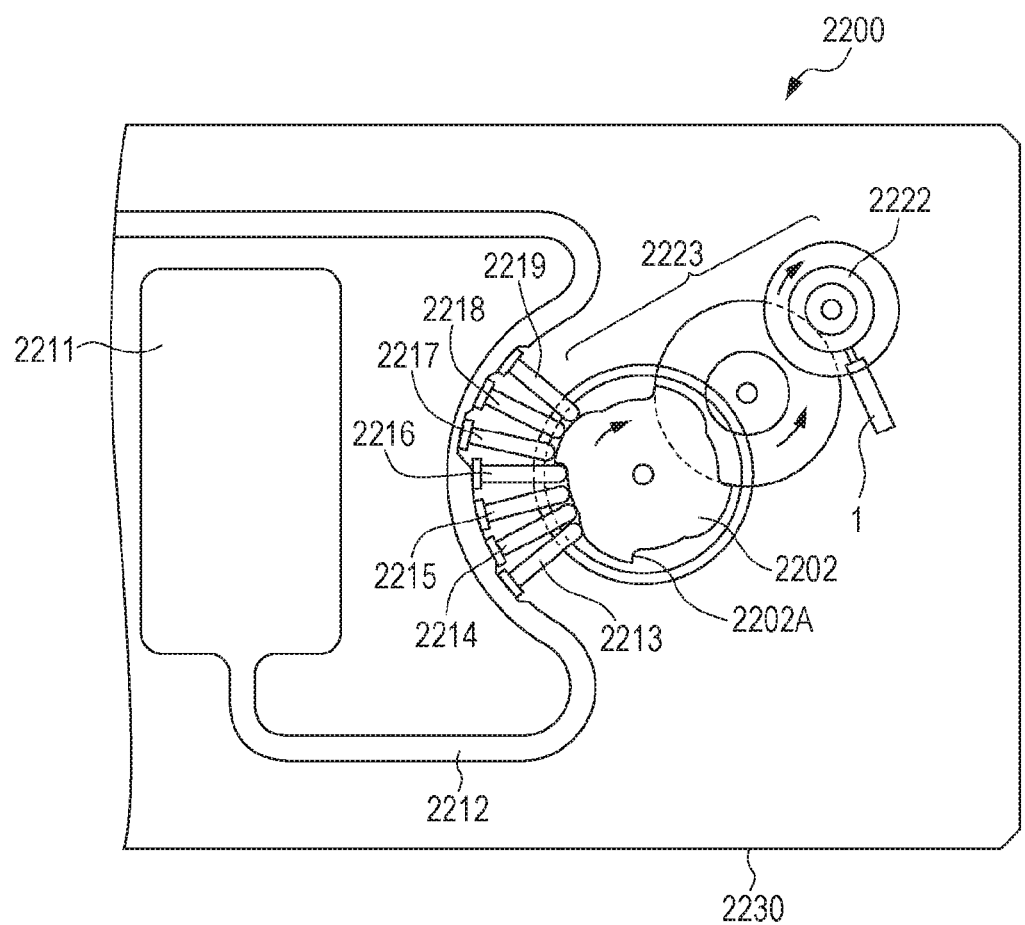
FIG. 12 illustrates an example of a liquid feed pump including the piezoelectric actuator.

FIG. 12 illustrates an example of a liquid feed pump 2200 including the piezoelectric actuator 1. The liquid feed pump 2200 is an example of a device including the piezoelectric actuator 1. In a case 2230 of the liquid feed pump 2200, a reservoir 2211, a tube 2212, the piezoelectric actuator 1, a rotor 2222, a deceleration transmission mechanism 2223, a cam 2202, and fingers 2213, 2214, 2215, 2216, 2217, 2218, and 2219 are provided. The reservoir 2211 is a container containing a liquid to be transported. The tube 2212 is provided for transporting the liquid from the reservoir 2211. The piezoelectric actuator is pressed against the side of the rotor 2222, and rotationally drives the rotor 2222. The torque of the rotor 2222 is transmitted to the cam 2202 via the deceleration transmission mechanism 2223. The fingers 2213 to 2219 are components for blocking the tube 2212. When the cam 2202 rotates, protrusions 2202A of the cam 2202 push the fingers 2213 to 2219 radially outward in sequence. The fingers 2213 to 2219 block the tube 2212 from the upstream side in the direction in which the liquid is transported (from the side where the reservoir 2211 is provided) toward the downstream side. This can gradually transport the liquid in the tube 2212 to the downstream side. This can realize the liquid feed pump 2200 that is small and is capable of accurately transporting a very small amount of liquid. It should be noted that the arrangement of the components are not necessarily the arrangement illustrated in FIG. 12. Moreover, instead of the components such as the fingers, a ball or the like provided in the rotor 2222 may block the tube 2212. The liquid feed pump 2200 as described above is applicable to a drug administration device for administering a drug solution such as insulin to a human body, or other devices. Power consumption can be reduced in a simple structure by using the piezoelectric actuator 1. Thus, it is possible to realize the liquid feed pump 2200 in which power consumption can be reduced in a simple structure.

It should be noted that the liquid feed pump 2200 according to the present embodiment may include the piezoelectric actuator 2 or the piezoelectric actuator 3 instead of the piezoelectric actuator 1. By using the piezoelectric actuator 2 or the piezoelectric actuator 3, output higher than that obtained by a conventional piezoelectric actuator can be obtained, and the piezoelectric actuator can be miniaturized. Thus, the drug administration device can be miniaturized.

The invention is not limited to the present embodiment, but various modifications can be made within the scope of the invention.

The embodiments and modification examples are mere examples, and the invention is not limited to these embodiments and modification examples. For instance, the embodiments and the modification examples can be appropriately combined.

The invention includes a structure virtually the same as the structures described in the embodiments. For instance, the invention includes a structure in which functions, methods, and effects are the same as those of the embodiments or a structure in which objectives and effects are the same as those of the embodiments. Moreover, the invention includes a structure in which unessential parts of the embodiments are replaced by other things. Moreover, the invention includes a structure that can achieve effects or objectives achieved in the structures described in the embodiments. Moreover, the invention includes a structure derived by adding the well-known art to the structures described in the embodiments.

The entire disclosure of Japanese Patent Application No. 2015-133503, filed Jul. 2, 2015 and Japanese Patent Application No. 2015-133550, filed Jul. 2, 2015 is expressly incorporated by reference herein.

What is claimed is:

1. A piezoelectric actuator comprising:
   a first piezoelectric vibrator including a first diaphragm and a plurality of first piezoelectric elements that are provided on the first diaphragm and include a first electrode, a second electrode, and a piezoelectric material layer held by the first electrode and the second electrode;
   a second piezoelectric vibrator including a second diaphragm and a plurality of second piezoelectric elements that are provided on the second diaphragm and include a first electrode, a second electrode, and a piezoelectric material layer held by the first electrode and the second electrode; and
   an inductor,
   wherein, a layout of the first piezoelectric vibrator in the first diaphragm is the same as a layout of the second piezoelectric vibrator in the second diaphragm, and
   positions of the plurality of first piezoelectric elements on the first diaphragm correspond to positions of the plurality of second piezoelectric elements on the second diaphragm, the second electrode of the plurality of first piezoelectric elements corresponds to the second electrode of the plurality of second piezoelectric elements, and the corresponding second electrodes are connected via the inductor.

2. The piezoelectric actuator according to claim 1, wherein a phase in which the first piezoelectric vibrator is driven is opposite to a phase in which the second piezoelectric vibrator is driven.

3. The piezoelectric actuator according to claim 1, wherein the first piezoelectric vibrator and the second piezoelectric vibrator are driven at a frequency near an anti-resonant point of a parallel resonant circuit that includes (i) the inductor and (ii) the plurality of first piezoelectric elements and the plurality of second piezoelectric elements connected via the inductor.

4. The piezoelectric actuator according to claim 3, wherein an inductance of the inductor has a value at which an anti-resonant frequency of the parallel resonant circuit is almost identical to a resonant frequency at which mechanical displacements of the plurality of first piezoelectric elements and the plurality of second piezoelectric elements reach the maximum.

5. A motor comprising:
   the piezoelectric actuator according to claim 1; and
   a driven object that is driven by the piezoelectric actuator.

6. A motor comprising:
   the piezoelectric actuator according to claim 2; and
   a driven object that is driven by the piezoelectric actuator.

7. A motor comprising:
   the piezoelectric actuator according to claim 3; and
   a driven object that is driven by the piezoelectric actuator.

8. A motor comprising:
   the piezoelectric actuator according to claim 4; and
   a driven object that is driven by the piezoelectric actuator.

9. A robot comprising:
   a plurality of linkages;
   a joint connecting the plurality of linkages; and the piezoelectric actuator according to claim 1 that drives the joint as a driven object.

10. A robot comprising:
a plurality of linkages;
a joint connecting the plurality of linkages; and
the piezoelectric actuator according to claim 2 that drives the joint as a driven object.

11. A robot comprising:
a plurality of linkages;
a joint connecting the plurality of linkages; and
the piezoelectric actuator according to claim 3 that drives the joint as a driven object.

12. A method of driving a piezoelectric actuator,
wherein the piezoelectric actuator includes:
a first piezoelectric vibrator including a first diaphragm and a plurality of first piezoelectric elements that are provided on the first diaphragm and include a first electrode, a second electrode, and a piezoelectric material layer held by the first electrode and the second electrode;
a second piezoelectric vibrator including a second diaphragm and a plurality of second piezoelectric elements that are provided on the second diaphragm and include a first electrode, a second electrode, and a piezoelectric material layer held by the first electrode and the second electrode; and an inductor, in the piezoelectric actuator, a layout of the first piezoelectric vibrator in the first diaphragm is the same as a layout of the second piezoelectric vibrator in the second diaphragm, and positions of the plurality of first piezoelectric elements on the first diaphragm correspond to positions of the plurality of second piezoelectric elements on the second diaphragm, the second electrode of the plurality of first piezoelectric elements corresponds to the second electrode of the plurality of second piezoelectric elements, the corresponding second electrodes are connected via the inductor, and the first piezoelectric vibrator and the second piezoelectric vibrator are driven in phases opposite to each other.

* * * * *